United States Patent

Schieman

[15] 3,662,247

[45] May 9, 1972

[54] PULSE WIDTH MODULATED INVERTER ADAPTIVE LOGIC

[72] Inventor: Robert G. Schieman, Cleveland Heights, Ohio

[73] Assignee: Reliance Electric Company

[22] Filed: Oct. 1, 1970

[21] Appl. No.: 77,108

[52] U.S. Cl. ..................................321/5, 318/227, 318/230, 318/231, 321/9 A

[51] Int. Cl. ....................H02m 1/12, H02m 7/52, H02p 5/38

[58] Field of Search .................321/5, 9 A, 9 R, 18; 318/227, 318/230, 231

[56] References Cited

UNITED STATES PATENTS

| | | | |
|---|---|---|---|
| 3,551,779 | 12/1970 | Campbell | 321/5 |
| 3,585,488 | 6/1971 | Gutt et al. | 321/9 A |
| 3,523,236 | 8/1970 | Howell et al. | 321/9 |
| 3,538,420 | 11/1970 | Klein | 321/9 A |
| 3,324,374 | 6/1967 | Corey | 321/9 |
| 3,443,196 | 6/1969 | Horner | 321/9 A |
| 3,423,662 | 1/1969 | Schlabach et al. | 321/9 A |

*Primary Examiner*—William H. Beha, Jr.
*Attorney*—Woodling, Krost, Granger & Rust

[57] ABSTRACT

A pulse width modulated inverter is disclosed wherein adaptive logic is provided to control conduction of the switch means in the inverter. This logic controls the inverter switching rate and modulating pulse and notch width so that the power inverter section does not overheat because of a switching rate or fail because of a narrow modulating pulse. The adaptive logic is responsive to pulse width, notch width and a maximum or minimum carrier frequency all controlling the change of the ratio of carrier frequency to fundamental frequency. A three-phase system is described wherein the ratio of carrier to fundamental frequency is capable of being maintained at 3:1, which establishes a non-symmetrical wave with second harmonics in the fundamental output frequency yet which establishes a higher output voltage than a ratio of 6:1 of the carrier to fundamental frequencies and eliminates a large step of voltage when changing from a carrier to fundamental frequency ratio of 6:1 up to an unmodulated six-step output voltage from the inverter.

40 Claims, 35 Drawing Figures

INVENTOR.
ROBERT G. SCHIEMAN
BY Woodling, Krost, Granger and Rust
ATTORNEYS

INVENTOR.
ROBERT G. SCHIEMAN
BY Woodling, Krost, Granger and Rust
ATTORNEYS

INVENTOR.
ROBERT G. SCHIEMAN
BY Woodling, Krost, Granger and Rust
ATTORNEYS

INVENTOR.
ROBERT G. SCHIEMAN
BY Woodling, Krost, Granger and Rust
ATTORNEYS

INVENTOR.
ROBERT G. SCHIEMAN
BY Woodling, Krost, Granger and Rust
ATTORNEYS

INVENTOR.
ROBERT G. SCHIEMAN
BY Woodling, Krost, Granger and Rust
ATTORNEYS

INVENTOR.
ROBERT G. SCHIEMAN
BY Woodling, Krost, Granger and Rust
ATTORNEYS

INVENTOR.
ROBERT G. SCHIEMAN
BY Woodling, Krost, Granger and Rust
ATTORNEYS

INVENTOR.
ROBERT G. SCHIEMAN
BY Woodling, Krost, Granger and Rust
ATTORNEYS

PULSE WIDTH MODULATED INVERTER ADAPTIVE LOGIC

BACKGROUND OF THE INVENTION

Pulse width modulated inverters have been suggested or constructed in several forms. Several involve the use of one or more synchronized carrier ratios. The ratio referred to is carrier frequency to inverter fundamental or operating frequency.

One prior art form is a fixed ratio system wherein the carrier ratio remains constant over the operating range of the inverter. Another prior art form is a variable ratio system wherein the carrier steps through a sequence of ratios as operating frequency is increased. This latter action maintains a high carrier frequency throughout the operating range, thereby producing only high frequency, easily filtered harmonics in the output voltage waveform. In the variable ratio system the switching of the thyristors or other switches is determined by sensing a DC voltage level proportional to carrier frequency. Switch points occur at maximum carrier frequency.

The variable ratio system is an improvement on the fixed ratio system because it permits a changeable ratio of carrier frequency relative to the fundamental or operating frequency of the inverter. The fixed ratio system has the disadvantages of a limited range of operation, for example, a 3:1 or 4:1 range in output voltage. Also this range in output voltage means a similar range in carrier frequency which cannot be carried to too high a value because this would mean too rapid a switching rate for the thyristor. On the other hand, at the low end of the carrier frequency range, this produces low frequency harmonics, for example, large order 5th and 7th harmonics. If the inverter is supplying power to an induction motor, for example, these harmonics are harmful because they do not contribute to torque at the fundamental frequency and instead merely cause overheating of the motor which will limit the torque available from the motor and cause de-rating of the motor for its size.

The variable ratio system is an improvement over the fixed ratio system because this permits a wider voltage range perhaps in the order of 10:1 in the output voltage of the inverter. However, the limitations as to pulse width still remain due to the fact that the thyristors cannot be switched at too high a rate else there will be overheating of the thyristors or the thyristors may fail to switch which failure would cause a torque pulsation in the output of the motor, if nothing worse. This torque pulsation could be extremely damaging if the motor is driving a sensitive load such as a paper web drive on a papermaking machine where the web is still wet and fragile. The variable ratio system is, therefore, still subject to two problems, one, a too narrow pulse width and two, a too narrow notch width, the gap between successive pulses. Both of these are directly related to the rapidity of switching the thyristors. As inverter drives become larger, the thyristors become larger as do the commutating components. The actual turn-off time of a thyristor might be in the order of 30–100 microseconds, for example, which sounds quite rapid and at first would not be considered to create any problems. However, there is usually a capacitor connected in the commutating circuit which must be discharged to establish the turn-off of a thyristor and next must be recharged in the opposite polarity to be ready for the next commutation.

As the thyristors get larger, so do the commutating capacitors and therefore, the total time which must be taken in a complete commutation period may be in the order of 300 to 400 microseconds. The term $\alpha$ shall be defined herein as the width of a notch between pulses, and the minimum width of $\alpha$ is governed by the complete commutation period. As will be shown later, a normal commutation scheme uses a ratio of 6:1 of carrier frequency to fundamental frequency to achieve an unmodulated six-step output waveform on a three-phase inverter output. When this waveform is modulated by putting a notch between two pulses in each half cycle, the symmetrical waveform now has two notches for a total time of $2\alpha$, and this, for example, might be 600 microseconds. If the inverter output fundamental frequency is at 60 Hz., for example, this is 5,555 microseconds in each 120° of a cycle. Therefore, subtracting the 600 microseconds from this period of the output waveform, one finds that the maximum output voltage that one can obtain is about 89 percent of the unmodulated six-step waveform, considering a carrier frequency of six times the fundamental frequency.

If one is attempting to obtain a small effective output voltage, then the pulses become narrow with wide notches therebetween. Again the circuit may impose limits on the minimum width of the pulses because of maximum thyristor switching rates to obtain these narrow pulses.

Accordingly, an object of the invention is to obviate the above-mentioned disadvantages.

Another object of the invention is to provide a pulse width modulated inverter with adaptive logic to maintain limits on pulse width, notch width and carrier frequency.

Another object of the invention is to provide an inverter system which will avoid overheating of the thyristors and the motor load on the inverter and minimize failure of commutation of the thyristors.

Another object of the invention is to provide an inverter system wherein an extra step is obtained in voltage intermediate the unmodulated six-step output waveform and a symmetrical modulated waveform having a carrier to fundamental frequency ratio of 6:1.

Another object of the invention is to provide an inverter system with adaptive logic to be responsive to notch width, pulse width and maximum carrier frequency and to obtain a smooth transition of output voltage continuously up to about 94% of the output voltage obtainable by an unmodulated six-step output waveform.

SUMMARY OF THE INVENTION

The invention may be incorporated in a pulse width modulated inverter operable from a direct current source to AC load terminals, comprising in combination, switch means selectively conductive to supply an AC voltage from the DC source to the load terminals, means to control conduction of said switch means to establish a load terminal voltage which is unsymmetrical in the positive and negative half cycles and with a single pulse of voltage in one half cycle and two pulses of voltage in the other half cycle separated by a gap having a width $\alpha$.

Other objects and a fuller understanding of the invention may be had by referring to the following description and claims, taken in conjunction with the accompanying drawing.

DESCRIPTION OF THE PREFERRED EMBODIMENT

Figure 1:
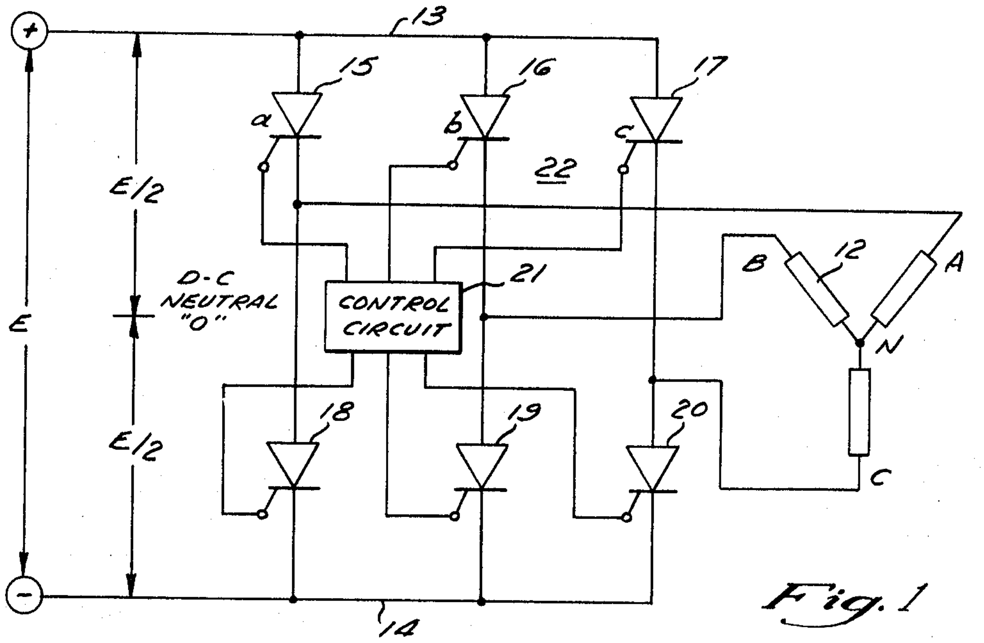
FIG. 1 is a schematic drawing of the inverter power circuit.

FIG. 1 shows the power bridge of an inverter circuit 11 embodying the invention wherein a three-phase load 12 is energized through switches from a positive DC bus 13 and a negative DC bus 14. The switches are shown as thyristors forming a three-phase bridge 22 with thyristors 15, 16 and 17 connected to the positive DC bus 13 and thyristors 18, 19 and 20 connected to the DC bus 14. Each thyristor connected to the positive bus is paired with a thyristor connected to the negative bus by being connected in series therewith. For conduction through the three-phase load 12, there is conduction through one thyristor from each pair and the control circuit 21 establishes sequential firing of the thyristors to establish three-phase energization of the load 12. The control circuit 21 is connected to the gates of the thyristors 15–20 for controlling the conduction of the various thyristors.

Figure 2:
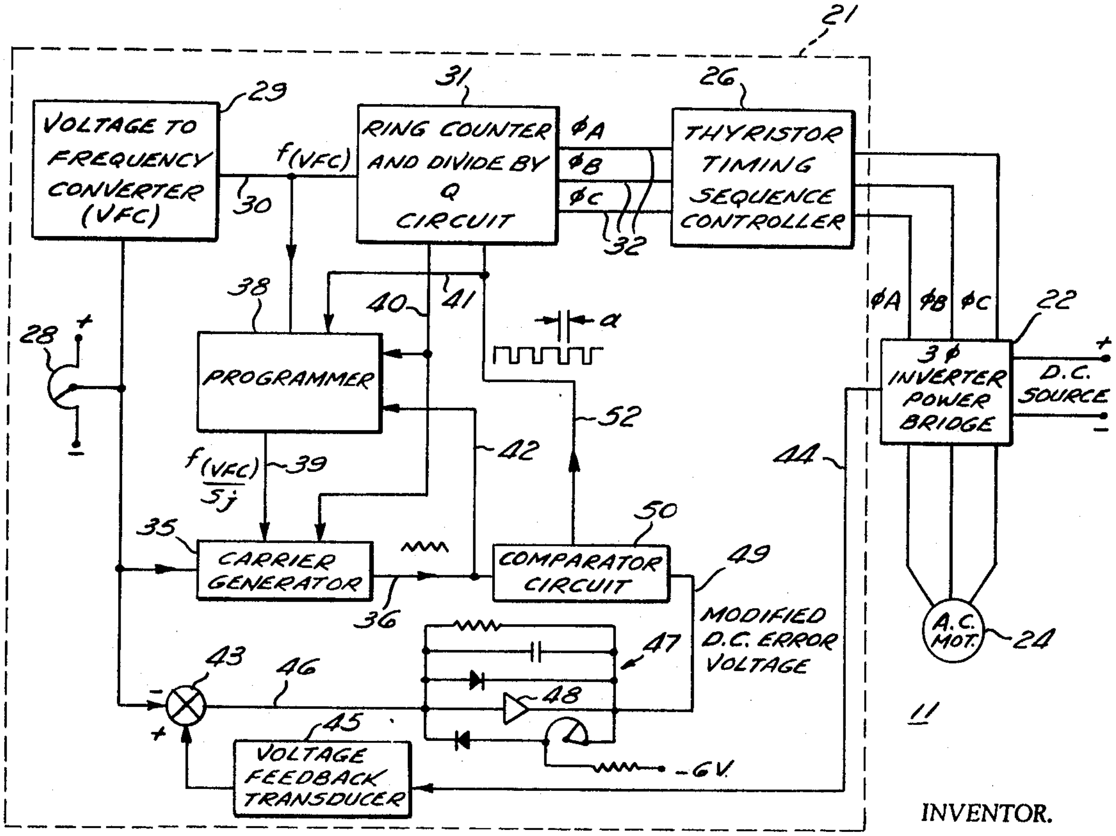
FIG. 2 is a block diagram of the control means for the inverter.

FIG. 2 illustrates in more detail the inverter system 11 which includes the power bridge 22 shown in detail in FIG. 1 plus the control circuit 21. The power bridge 22 is shown as energizing at a variable operating frequency or fundamental frequency an AC motor 24. The control circuit 21 includes a thyristor timing sequence controller 26 which controls the firing and commutation of the power bridge 22. This may take any one of several well known forms. A variable DC voltage reference may be obtained from a potentiometer 28, for example, and supplied to a voltage-to-frequency converter 29. This may be one of several commercially available models such as Reliance Electric Company Part No. 0–51814–1. As the input DC voltage increases, the frequency output 30 of the converter 29 also increases. This output voltage is supplied to a ring counter 31 which in essence is a three-phase square wave generator supplying three separate phase signals on the output lines 32 of this ring counter 31. Each of these phase signals will be identical but displaced 120° in phase from each other and these are supplied to the timing sequence controller 26. The variable DC voltage reference 28 is also supplied to a carrier generator 35 the output of which on lead 36 is an isoceles triangular wave form. The frequency of this triangular waveform is determined by a programmer 38 which has an input from the voltage-to-frequency converter and divides down this voltage by a given amount $S_j$ where $j$ is any integer. This dividing down establishes a lower frequency on an output lead 39 and this establishes the carrier generator at that lower frequency at a given ratio, but a changeable ratio, relative to the fundamental or operating frequency of the inverter power bridge 22. The frequency on the lead 39 establishes the frequency of the triangular carrier waveform on lead 36. A synchronizing lead 40 from the ring counter 31 provides a synchronizing signal in accordance with one of the output phases of the ring counter 31, for example, phase C. This synchronizing lead is supplied both to the programmer 38 and to the carrier generator 35. This ring counter may be any one of several commercially available. The carrier generator output frequency is also fed back on line 42 to help control the programmer 38.

The variable DC voltage reference 28 is also supplied to a summing device 43. This is because the increase in voltage must be proportional to an increase in frequency in order to obtain the correct volts per Hertz relationship for the motor load to operate properly. A feedback signal is provided from the motor 24 or from the inverter power bridge 22, as shown, along a lead 44 and through a voltage feedback transductor 45 to this summing device 43. The summing device 43 is connected as a subtraction device subtracting the feedback signal from the variable DC voltage reference signal to establish an error signal on an output lead 46. This error signal is supplied through a notch width clamp circuit 47 which includes an operational amplifier 48 connected to clamp the voltage at a preset maximum value yet permitting it to decrease below this value. This variable error signal as modified by the clamp circuit 47 thus appears on a lead 49 and is supplied to a comparator circuit 50. This comparator may be any commercially available, such as Reliance Electric Part No. 0–51812–2. This comparator circuit compares this variable DC error signal with the triangular carrier waveform and whenever the error signal exceeds the triangular waveform, then the comparator has an output on lead 52. Accordingly, the output on this lead is a square wave pulse separated by a notch which has a minimum width alpha as explained below. This output on lead 52 is fed to the ring counter to establish the modulation signal to modulate the three-phase signal on output leads 32. This output from the comparator circuit 50 is also fed by a lead 41 to supply pulse width and notch width information to the programmer 38.

OPERATION

The inverter power circuit consists of six switching elements which are located between the DC bus and the load as shown in FIG. 1. An analysis can be made of this power module by replacing each thyristor with an ideal mechanical switch. Then the development of an AC waveform is accomplished by simply letting these switches conduct sequentially over a given interval. The top switches 15, 16 and 17 creating the positive outputs and the bottom switches 18, 19 and 20, the negative outputs. These voltage swings are with respect to a theoretical DC neutral "*o*", also shown in FIG. 1. This latter point was devised only to simplify the discussion.

FIGS. **3*a*, 3*b* and 3*c* illustrate the waveforms 55, 56 and 57** derived from this sequential switching action. The indicated switches are sequenced to give a 120° phase displacement between the three phases. The instantaneous values of $\Phi_{AO}$ and $\Phi_{BO}$ and $\Phi_{CO}$ can be used to determine the actual output voltage waveforms.

The line to line voltage relationships for these figures are:

$$\Phi_{AB} = \Phi_{AO} - \Phi_{BO}$$
$$\Phi_{BC} = \Phi_{BO} - \Phi_{CO}$$
$$\Phi_{CA} = \Phi_{CO} - \Phi_{AO}$$

Figure 3A:
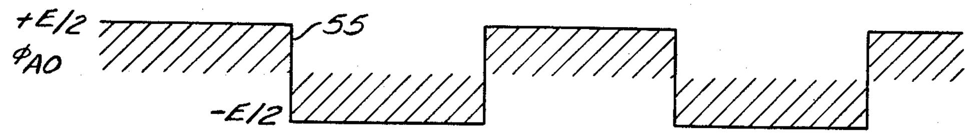
FIGS. 3 and 4 are graphs of voltage versus time explaining the operation of the inverter.
Figure 3B:
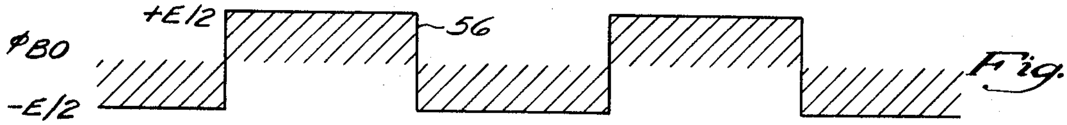
Figure 3C:
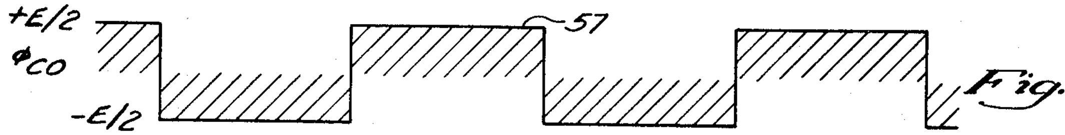
Figure 3D:
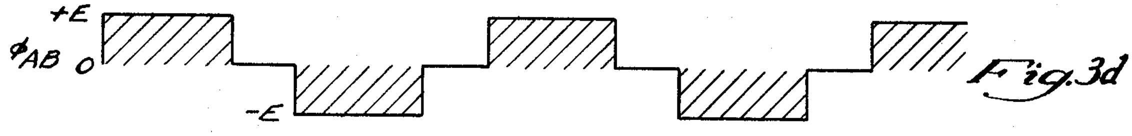
Figure 3E:
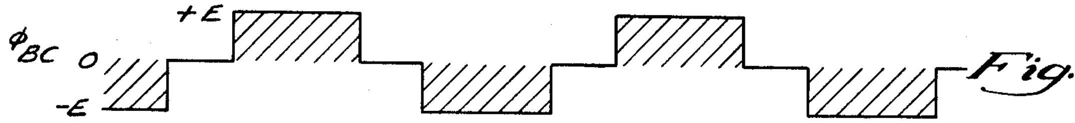
Figure 3F:
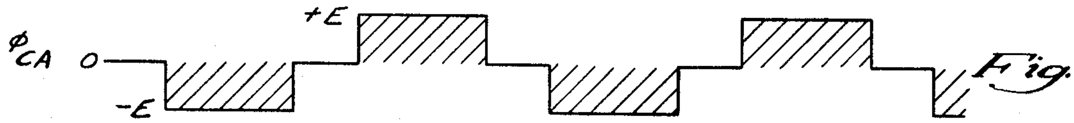
Figure 3G:
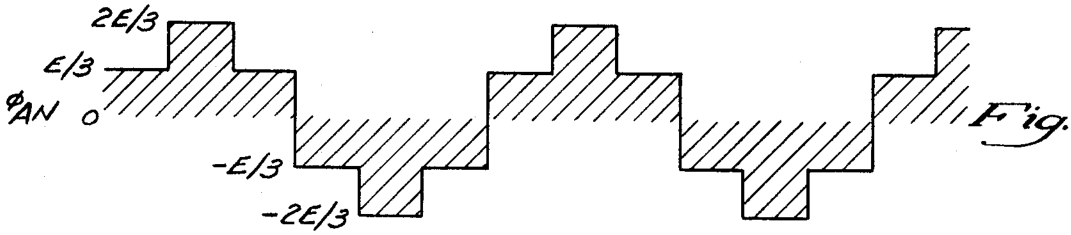

The resultant line to line waveforms are shown in FIGS. **3*d*, 3*e* and 3*f*. The line to load neutral waveform, shown in FIG. 3*g***, clearly indicating the six-step envelope, can also be calculated and plotted with the aid of these line to line waveforms.

$$\Phi_{AN} = \tfrac{2}{3}\Phi_{AO} - \tfrac{1}{3}[\Phi_{BO} + \Phi_{CO}]$$
$$\Phi_{BN} = \tfrac{2}{3}\Phi_{BO} - \tfrac{1}{3}[\Phi_{AO} + \Phi_{CO}]$$
$$\Phi_{CN} = \tfrac{2}{3}\Phi_{CO} - \tfrac{1}{3}[\Phi_{AO} + \Phi_{BO}]$$

Thus, the basic six-step waveform shown in FIG. **3*g* is achieved by the simple switching action of the 3Φ inverter power bridge 22 shown in FIG. 1**.

The adaptive logic of the inverter of the present invention achieves six-step modulation which may be termed "notch width" modulation. This system could also be referred to as "pulse width" modulation, since altering the notch or dwell interval between pulses affects pulse width as well. Speaking in terms of notch widths merely simplifies the explanation of the inverter synthesized output waveforms.

The previous section showed how an unmodulated six-step waveform could be obtained by the sequential switching action of thyristors in a 3Φ inverter bridge. The circuit of FIG. 2 will also achieve a modulated six-step system. In FIG. 2, the resultant output of comparator circuit 50 is a notch width modulated pulse train on lead 52. These pulses are used to modulate the 3Φ outputs of the ring counter 31, each phase of which is displaced from another by 120°. The 3Φ modulated ring counter outputs drive the thyristor firing sequence controller 26 which in turn activates the 3Φ inverter power bridge 22.

Two additional elements of FIG. 2 of importance at this time are the "divide by" (Q) and ($S_j$) circuits. The divide by Q circuit is shown as part of the ring counter 31, and essentially consists of a series of flip-flops. As such, it is quite similar to the divide by Sj circuit described below in connection with FIG. 8. Basically, these divider circuits operate on the output frequency of the VFC ($f_{(VFC)}$) to produce the inverter output frequency $(f_{(VFC)})/(Q)$ and the carrier frequency $(f_{(VFC)})/(S_j)$. The ratio of carrier frequency to inverter frequency is therefore $Q/S_j$ which will be defined as $R_{c/f}$. $Q$ will be shown to be a constant for the particular modulation technique under investigation, while $Sj$ will obviously vary with the ratio $R_{c/f}$. Note that only ratios of integer multiples of three can be used to obtain a balanced output in this three-phase system.

Figures 4A, 4B, 4C, 4D, 4E:
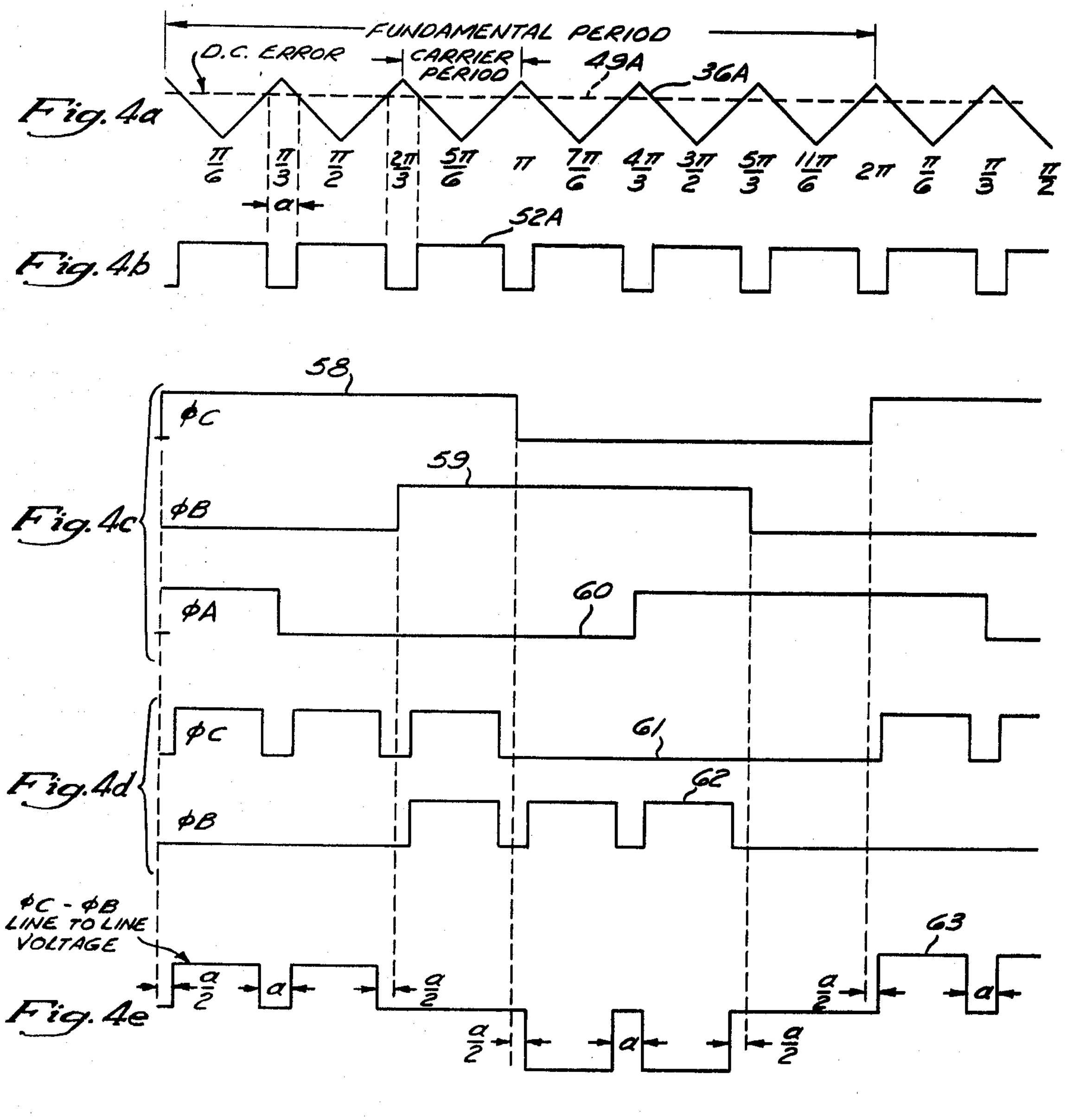

FIG. **4*a* shows the two signals that are compared to produce the notch width modulated pulse train. The two signals are the modified DC error voltage 49A from lead 49 and the isosceles triangle shaped carrier waveform 36A from the carrier generator 35. This carrier waveform shown is 6 times the frequency of the fundamental inverter output frequency. The resultant comparator output or modulated pulse train 52A is shown in FIG. 4b. The notch width "$\alpha$" between pulses is also indicated in FIG. 4b**.

FIG. 4c shows the unmodulated outputs 58, 59 and 60 of all three ring counter phases and FIG. 4d shows the difference when the phase outputs 61 and 62 are modulated. FIG. 4e is an example of the line-to-line voltages 63 produced by the two modulated outputs. Obviously, output voltage varies as a function of $\alpha$.

Figures 4F, 4G, 4H, 4I, 4J, 4K, 4L, 4M, 4N, 4P:
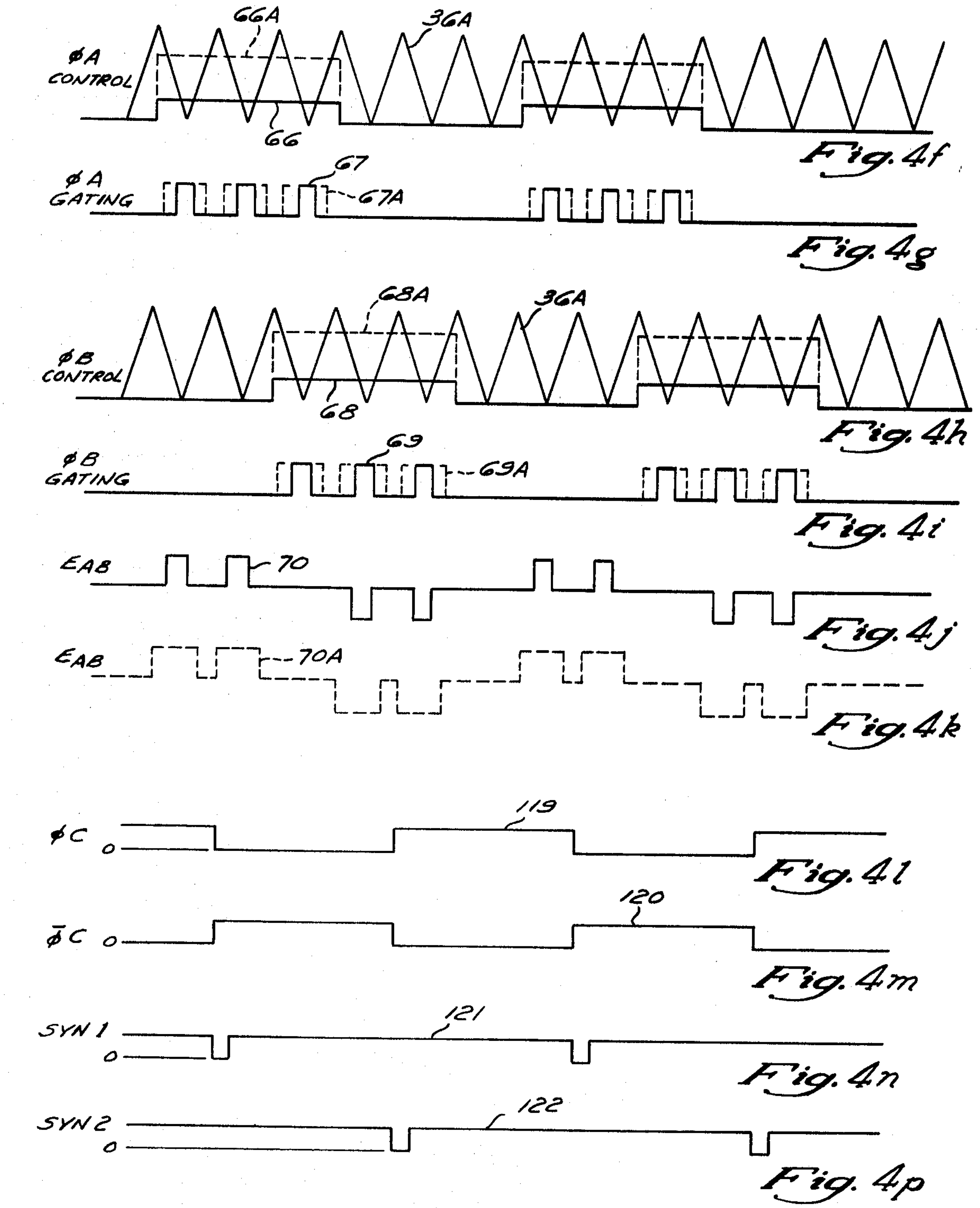

FIGS. 4f through 4k illustrate an alternative manner of producing the modulated output waves of the inverter power bridge 22. In this case the triangular carrier signal 36A is compared with a ΦA control signal 66. This is a square wave signal similar to those shown in FIG. 4c. When the square wave output signal 66 exceeds the magnitude of the triangular carrier 36A, then there is an output signal as a pulse in a ΦA gating signal 67. This is shown in FIG. 4g. FIG. 4f also shows a dotted line indicating the ΦA control signal 66A which is increased in magnitude like the increase in magnitude in the DC error signal 49A of FIG. 4a. Accordingly, FIG. 4g shows that the pulses under these conditions would be widened out as shown by curve 67A.

FIG. 4h shows this same carrier waveform 36A compared with a ΦB control signal 68 resulting in the ΦB gating signal 69 shown in FIG. 4i. Again the increase in magnitude of the ΦB control signal is shown at 68A and the increasing pulse width of the gating signal is shown at 69A. FIG. 4j shows the line-to-line voltage between phases A and B with the waveform 70 such as would appear on the output of the power bridge 22. FIG. 4k shows the waveform 70A corresponding to the gating signals 67A and 69A which would result in the wider pulses. This would establish a greater RMS magnitude of voltage on the output of the inverter.

The FIGS. 4f–4k are similar to the FIGS. 4a–4e in that a first signal having some portions of constant magnitude is compared with a triangular carrier signal. In FIG. 4a this first signal is the error voltage 49A and in FIG. 4f it is the error control signal 66.

Figures 5, 6:
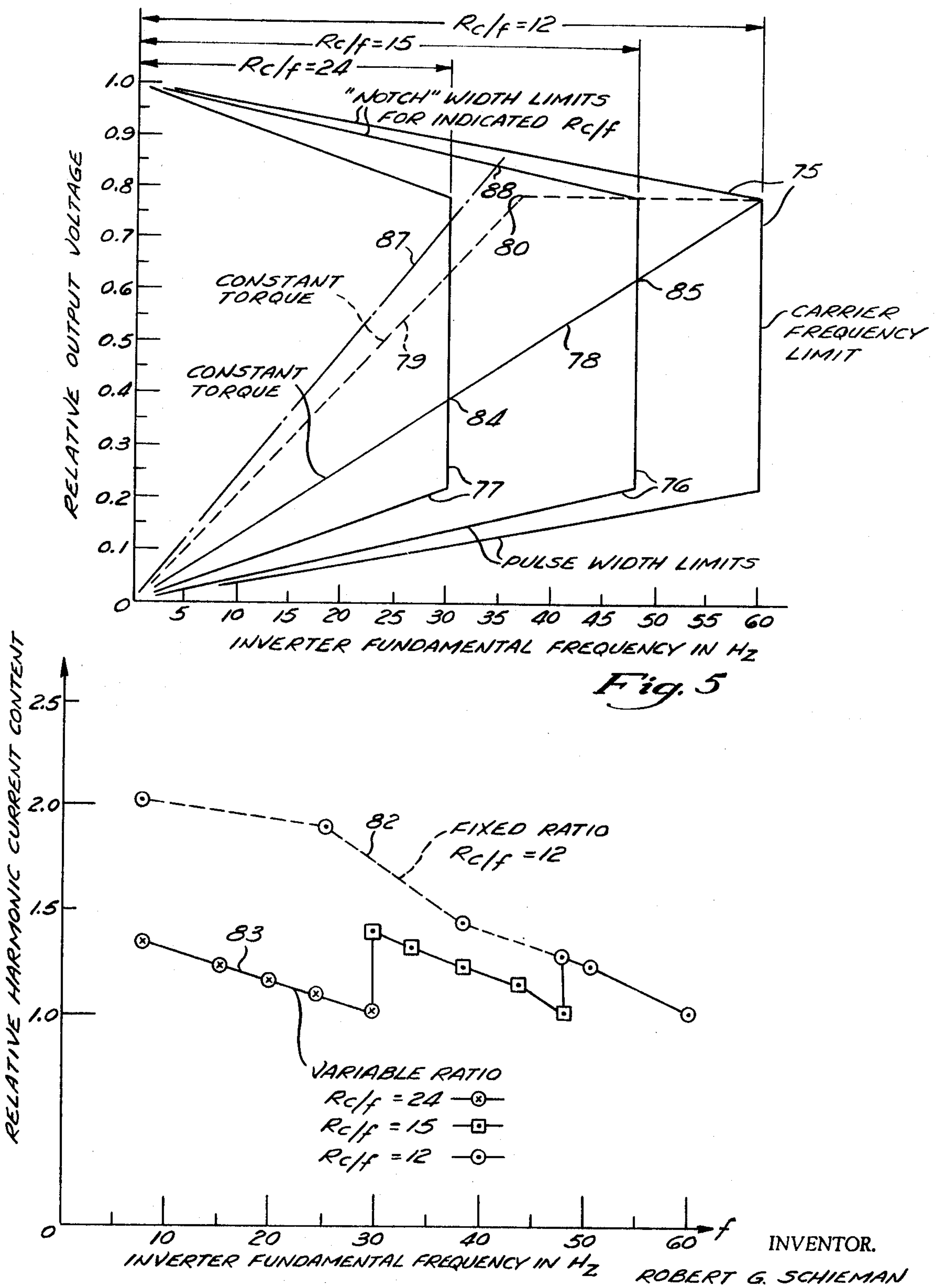
FIG. 5 is a graph of output voltage versus inverter fundamental frequency.
FIG. 6 is a graph of harmonic content versus fundamental frequency.
Figure 7:
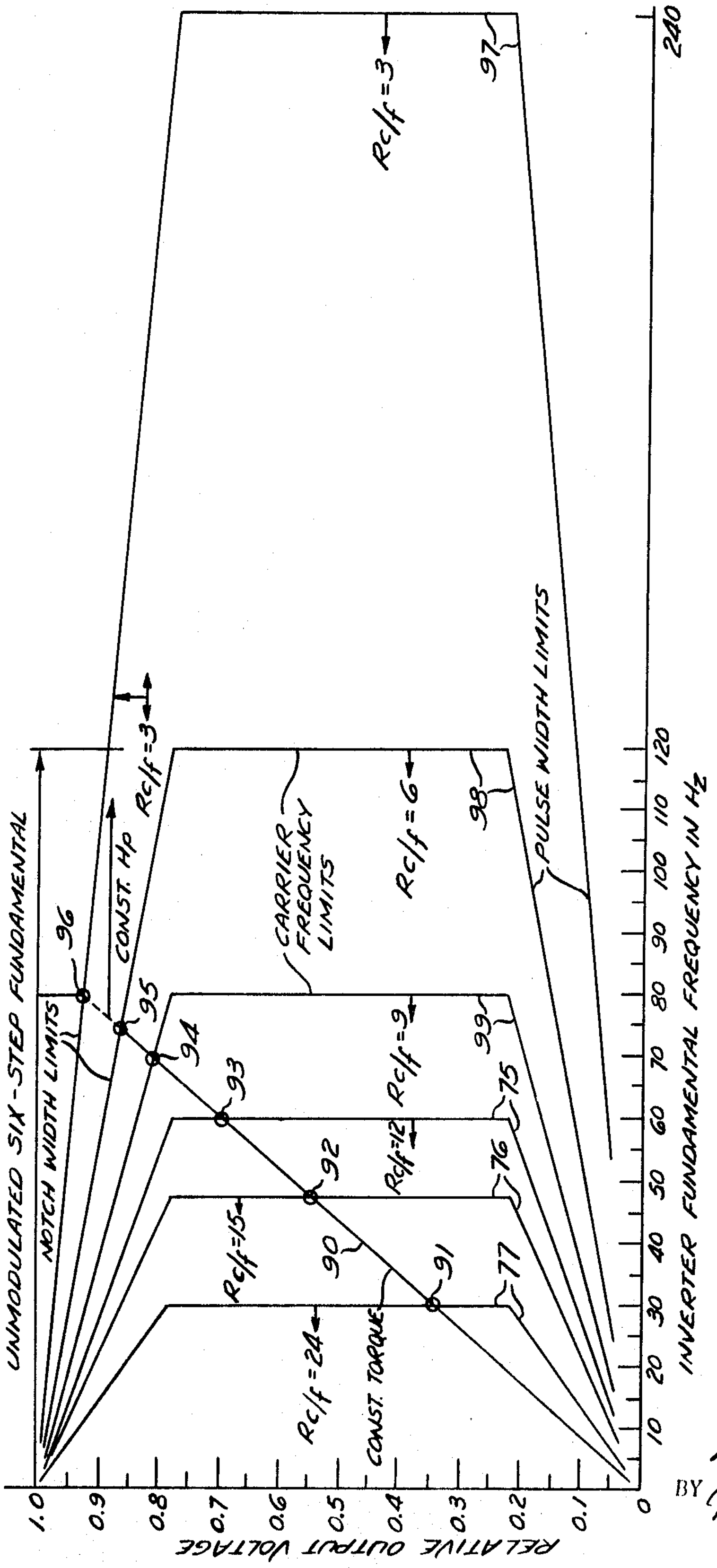
FIG. 7 is a graph of output voltage versus inverter fundamental frequency.

FIGS. 5 and 7 will be used in describing inverter output characteristics and show plots of output voltage versus inverter operating or fundamental frequency (Hz). The voltage scale is in relative line-to-line voltage units. The RMS fundamental of the modulated wave is compared with the RMS fundamental of an unmodulated six-step waveform. These units were selected since the RMS of the fundamental is the principle torque producing component of the waveform and the theoretical maximum limiting value of the modulated wave is pure six-step. Fourier analysis was used to obtain these fundamental components.

Two simplified Fourier expressions which govern the calculation of such fundamental components are:

1. Assuming symmetry around $\pi/2$ the Fourier cosine terms vanish. Integrate the sine terms over the whole cycle and obtain the RMS value of the resultant fundamental. This is used for waveforms where ($R_{c/f3}$) is an odd integer.

$$E_{max_1}=\frac{1}{\pi}\int_0^{\pi} f(\theta)\sin\theta d\theta$$

$$E_{max_1}=\frac{1}{\pi}\left[\sum_{H=1}^{m}\int_{\phi H1}^{\phi H2} E_{max}\sin\theta d\theta\right]$$

$m=[\frac{2}{3}R_{c/f}+1]$ $RMS$ of fundamental equals $\frac{E_{max_1}}{\sqrt{2}}$ Where:

$E_{max}$ = voltage level of fixed DC supply to inverter power module.

$E_{max_1}$ = maximum value of fundamental $m$ = number of integration intervals $R_{c/f}$ = ratio of carrier frequency to inverter operating frequency.

$\Phi_{H1}$ to $\Phi_{H2}$ are the integration limits on an individual pulse. ex.

$\Phi_{11}$ to $\Phi_{12}$ limits on first pulse in the cycle $\Phi_{21}$ to $\Phi_{22}$ limits on second pulse in the cycle $\Phi_{31}$ to $\Phi_{32}$ limits on third pulse in the cycle etc.

2. Assuming half cycle symmetry around $\pi$, the cosine terms again vanish. This time the sine terms need only be integrated over half a cycle. This can be applied to waveforms where $R_{c/f}$ is an even integer.

$$E_{max_1}=\frac{2}{\pi}\left[\sum_{H=1}^{n}\int_{\phi H1}^{\phi H2} E_{max}\sin\theta\, d\theta\right]$$

where: $n = R_{c/f}3$

Unfortunately, the practical components used to generate this modulated waveform place restrictions on $\alpha$. Specifically, the switching ability of the power thyristors limit both the upper and lower values of $\alpha$ at a given frequency and carrier ratio. Minimum $\alpha$ as well as minimum pulse width (max. $\alpha$) are limited by a combination of thyristor switching and recovery times. The dual nature of this limitation on both notch and pulse is easy to understand since both result from consecutive transitions by several thyristors. A typical operating time value for commercially available devices is 300 $\mu$sec. This limiting value will be assumed throughout this specification.

Basically these notch width limitations produce the following results:

1. The maximum voltage obtainable for a given $R_{c/f}$ varies inversely with inverter operating frequency.
2. A minimum output voltage must be maintained for a particular $R_{c/f}$ and operating frequency. This minimum voltage requirement increases with inverter output frequency.

There is still another significant limitation placed on the modulator by the power switching thyristors. This deals with the maximum number of effective switches a thyristor may make per cycle. Looking back at the waveforms in FIG. 4d, one sees that thyristor switching occurs on only one half the cycle in each phase. The thyristors remain essentially dormant on the opposite half cycle. Therefore, in the proposed system carrier frequency can be twice the value obtainable in a technique where modulation must take place over the complete cycle. A typical carrier frequency limit assumed for the purposes of this paper would be 750 Hz.

The carrier and notch width limitations can be combined to generate an inverter output characteristic envelope 75. Such a representation is shown in FIG. 5. The basic conditions involved for this Figure are:

a. Carrier ratio $R_{c/f}$ = 12 b. Minimum notch or pulse width 300 $\mu$sec.

c. Maximum carrier frequency 750 Hz.

The trapezoidal area 75 bounded by the notch width, pulse width and carrier frequency limits, and the relative voltage abscissa encloses the permissible inverter operating region. This means that provided the inverter output volts per Hertz relationship remains within this envelope, no malfunction will occur due to the three limitations described.

FIG. 5 also shows two typical motor operating curves 78 and 79, which maintain essentially constant volts per Hertz relationship for proper motor operation. Curve 78 is a constant torque application, while curve 79 is constant torque over the first half of its range and then constant horsepower for the remainder.

Viewing the two curves, curve 78 is easily satisfied, however, curve 79 requires the addition of the notch width clamp 47. The purpose of this clamp 47 is to limit the notch width at maximum frequency. Referring to the block diagram in FIG. 2, it is seen that the clamp operates on the DC reference voltage level, or if feedback is used, it operates on the DC error signal. Basically, it is adjusted so that it clamps this DC signal to a maximum value which will not permit $\alpha$ to become less than 300 μsec. Such an arrangement has the restriction that the available inverter output voltage is always less than the notch width limited voltage at the constant horsepower transition point 80. Obviously, this maximum changeover voltage never exceeds the notch width limited value at the highest operating frequency.

The primary drawback of the fixed ratio system, using only envelope 75, for example, is that as carrier frequency is decreased, motor harmonic currents increase. The effects of such currents is well known, they include increased motor losses which result in unwarranted temperature rises. FIG. 6 has a curve 82 indicating this relative increase in harmonic currents with a corresponding decrease in inverter fundamental frequency. It also shows the effect of switching to different carrier ratios as frequency changes. This latter technique is referred to as a variable ratio modulation.

Variable ratio can obviously be used to confine the increase in harmonic currents to a much more acceptable range.

FIG. 5 further shows envelopes 76 and 77, which together with envelope 75 provide a variable ratio system. Basically, variable ratio consists of the superposition of two or more fixed ratio envelopes. The switching points between carrier ratios are primarily determined by the maximum allowable carrier frequency. For example, the switch points 84 and 85 on curve 78 both take place at a carrier frequency of 720 Hz. The signal for carrier switching is taken from the DC reference level that controls VFC frequency and hence carrier frequency.

Although variable ratio suffers from the same notch width clamp problems as the fixed ratio system, it offers a reasonable solution to holding down harmonic losses since the number of possible carrier ratios is fairly extensive. Curve 83 on FIG. 6 shows the decreased harmonic losses with variable ratio. This argument holds until, as depicted by a motor operating curve 87, the slope of the volts/Hz. curve is increased and the relationship intersects a notch width limit at point 88 before reaching rated output frequency. Now one is faced with the dilemma of either adjusting each and every switch point so that it occurs at highest possible carrier frequency before reaching a notch limit, or ratioing down all the switch points so that no such violation can occur. Considering the numerous combinations possible, the adjustment of individual switch points must be excluded. Ratioing down the switch points with some increase in harmonics is the only practical solution for the technique. This limitation sets the stage for the final discussion involving adaptive control of the carrier ratio.

ADAPTIVE RATIO SIX-STEP MODULATOR

Like the variable ratio system, the adaptive system is built around a specific series of fixed modulation ratios. However, unlike that method, carrier switch points are not solely manipulated by a DC voltage level that controls only carrier frequency through the VFC 29. On the contrary, all adaptive switching results from direct measurements on pulse and notch widths as well as carrier frequency. The adaptive circuitry measures these parameters and takes action in accordance with its findings every inverter operating cycle. Basically, during the first half of each cycle such information is accumulated, interrogated and a decision made concerning whether or not a carrier switch is required. If a switch is found to be necessary, it is accomplished in a synchronized manner completely compatible with the 3Φ inverter output. This transition is made at the start of the last half of the cycle. These changes produce no noticeable torque disturbances in the motor.

Once programmed for a specific set of conditions, the adaptive system automatically handles, in an optimum fashion, all volts/Hz. relationships within the inherent capability of the inverter. Primarily it maintains the highest ratio of carrier to operating frequency, thereby holding harmonics to a minimum. It also responds rapidly to incoming line or load fluctuations that might cause notch width problems. For example, when operating at a voltage and a frequency slightly below the notch width limit for a given carrier, any sudden reduction in DC supply voltage will result in an almost instantaneous decrease in notch width. This is brought about by the efforts of the voltage regulator or error signal to maintain the previously established voltage level. Under such circumstances adaptive control automatically resolves the problem by switching down to the next lowest carrier ratio, thereby, restoring adequate notch width.

FIG. 7 illustrates the adaptive ratio system by including envelopes 75, 76 and 77 and additional permissible envelopes 97, 98 and 99. A constant torque curve 90 is shown in FIG. 7. The control circuit 21 is set to generate and measure the characteristics of six carrier ratios: the ratios involved are:

1. $R_{c/f} = 24$
2. $R_{c/f} = 15$
3. $R_{c/f} = 12$
4. $R_{c/f} = 9$
5. $R_{c/f} = 6$
6. $R_{c/f} = 3$

An additional feature indicated in FIG. 7, the ability to switch from $R_{c/f} = 3$ to unmodulated six-step and back again, will be described later. As an example, typical limits on carrier frequency, pulse and notch width, generate the following adaptive intelligence:

a. Decrease carrier ratio whenever notch width decreases to 300 μsec.
b. Increase carrier ratio whenever pulse width decreases to 300 μsec.
c. Decrease carrier ratio whenever carrier frequency exceeds 750 Hz.
d. Increase carrier ratio whenever the resultant carrier frequency will not violate conditions (a) and (c).

Condition (d) requires some further explanation. First of all, hysteresis must be introduced between commands to advance and retard carrier ratios to prevent any oscillatory situations. Secondly, a transfer to a higher carrier ratio cannot be made on the basis of carrier frequency alone. The presence of acceptable pulse and notch width values in the resultant waveform must be guaranteed as well. Adaptive control insures against premature switching by comparing the notch width in the carrier waveform it intends to switch against a reference time determined by the ratio of the two adjacent carriers. For example, in FIG. 7 curve 90 will have switch points 91–96 at different carrier ratios, and the notch width time in 6 $R_{c/f}$, between switch points 94 and 95 must exceed at least 450 μsec. before a change to 9 $R_{c/f}$ can be permitted. This value results from taking into account the fact that any notch width in 6 $R_{c/f}$ will be reduced by a factor (6 $R_{c/f}$)/(9 $R_{c/f}$) when a switch is made to 9 $R_{c/f}$. This is because ⅔ × 450 μsec. = 300 μsec. – notch width limit in 9 $R_{c/f}$. Obviously, the same criteria must be applied to pulse width limitations at the bottom end of the characteristic envelope. A composite picture of the limits governing the adaptive system shown in FIG. 7 is presented in Table 1.

TABLE 1

| Carrier Ratio $R_{c/f}$ | Conditions For Decrease to Next Lower Ratio | Conditions for Advance to Next Higher Ratio |
|---|---|---|
| 24 $R_{c/f}$ | Carrier ≥ 750 Hz or Pulse or Notch Width ≤ 300 μsec. | No higher ratio permitted in example system |
| 15 $R_{c/f}$ | Same condition | Carrier ≤ 450 Hz and both pulse and notch widths >480 μsec. |
| 12 $R_{c/f}$ | Same condition | Carrier ≤ 576 Hz and both pulse and notch widths ≥375 μsec. |

| | | |
|---|---|---|
| 9 $R_{c/f}$ | Same condition | Carrier ≤ 540 Hz and both pulse and notch widths >450 μsec. |
| 6 $R_{c/f}$ | Same condition | Carrier ≤ 480 Hz and both pulse and notch widths > 450 μsec. |
| 3 $R_{c/f}$ | Special program switch allows 3 $R_{c/f}$ transfer to unmodulated six-step when notch width ≤ 300 μsec. | Carrier ≤ 360 Hz and both pulse and notch widths >600 μsec. |
| Unmodulated six-step (special program) | | Notch width* > 300 μsec. |

*Notch width is still being monitored by the adaptive circuits in the modulator or control circuit 21 even though a transfer has been made to unmodulated six-step. Therefore, as carrier frequency present now only in the modulator is reduced, the still active measurement circuits sense a notch width ≤ 300 μsec. and permits a return from unmodulated six-step to 3 $R_{c/f}$.

Superimposing a counter voltage proportional to the difference in feedback voltage between the 3 $R_{c/f}$ waveform and the unmodulated six-step signal at the switch point, enables the adaptive controller to continue to measure a fictitious 3 $R_{c/f}$ notch width. This keeps the regulated voltage within range so it is always ready to function. Coincident with a return to the 3 $R_{c/f}$ mode this signal is removed from the DC reference signal that determines notch width.

Figure 8A:
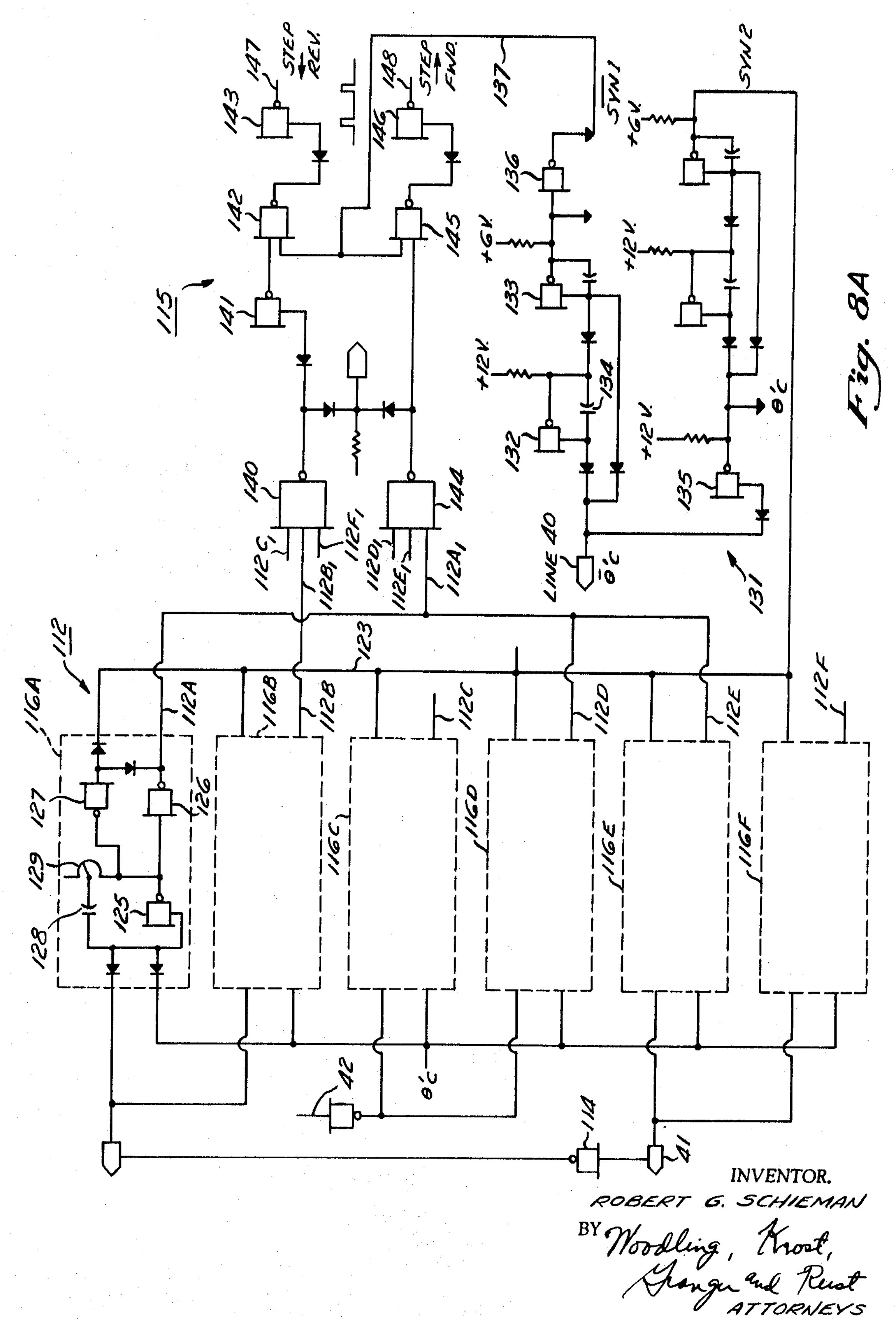
FIGS. 8A and 8B when laid side by side form a FIG. 8 to show a schematic diagram of the circuit of the programmer.
Figure 8B:
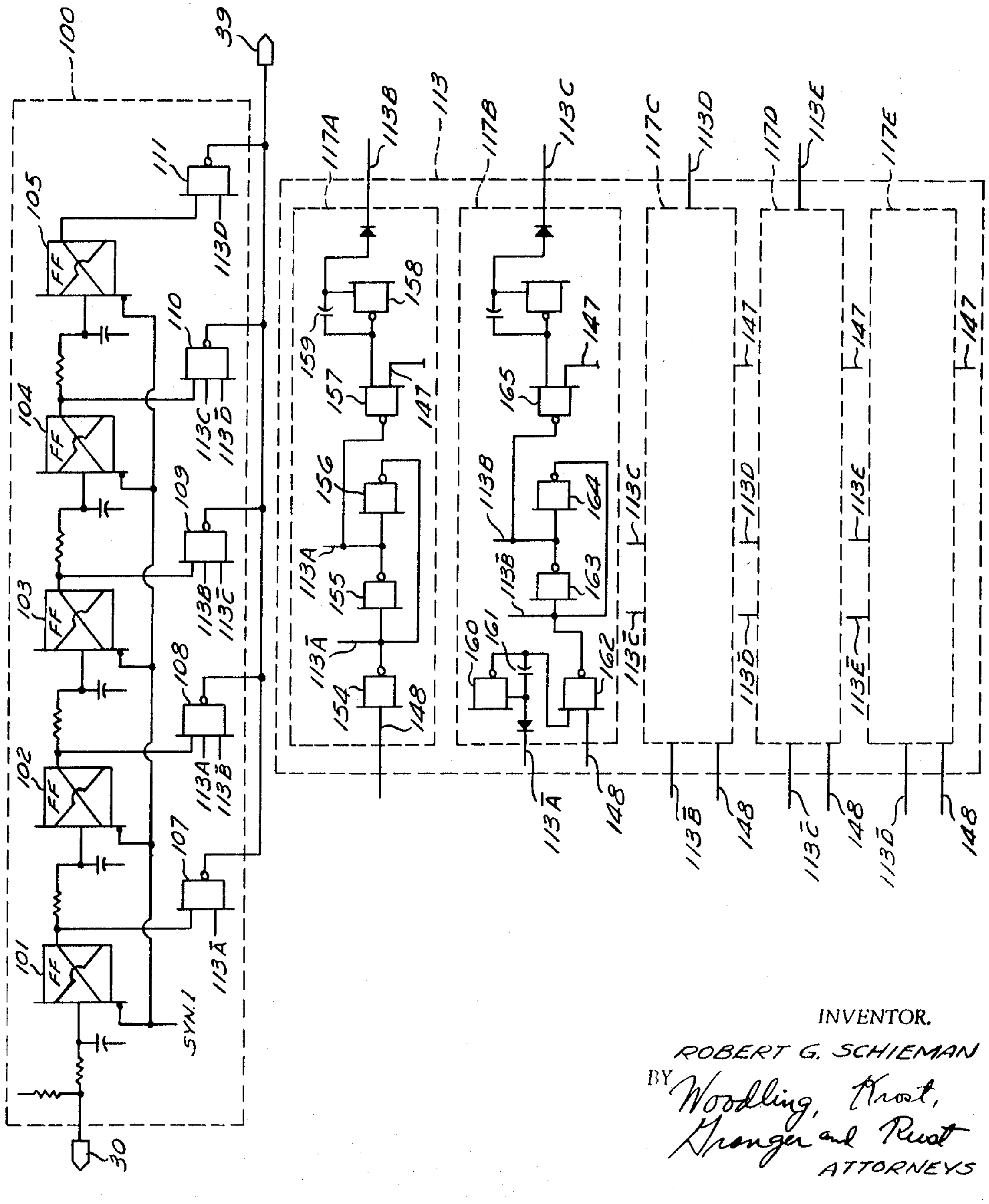

FIG. 8 is a schematic diagram of a simple programmer for the ratios $R_{c/f}$ of 48, 24, 12, 6, 3 and unmodulated, and is a simplification of the programmer 38 as shown in FIG. 2. The voltage to frequency converter 29 has an output on lead 30, $f_{VFC}$, which goes into a divide by $S_j$ circuit 100, which includes a group of flip-flops 101, 102, 103, 104 and 105. The frequency is divided down one-half, one-fourth, one-eighth, one-sixteenth and one-thirty-second of $f_{VFC}$ out of VFC 29 by these flip-flops. The desired carrier frequency output is selected by Nand gates 107, 108, 109 110 and 111 connected, respectively, to these flip-flops. One of the gates are turned on as a function of the position of an electronic stepping relay 113. The carrier frequency is applied by line 39 to control the carrier generator 35. The gates 107–111 are selected by the electronic stepping relay 113. This stepping relay 113, as described below, has outputs 113A, B, C, D and E and outputs 113$\bar{A}$, $\bar{B}$, $\bar{C}$, $\bar{D}$ and $\bar{E}$. The bar over the letter A means "not A," or the inverse of A.

A Nand gate has a truth table as follows:

| INPUT | | OUTPUT |
|---|---|---|
| 1 | 1 | 0 |
| 1 | 0 | 1 |
| 0 | 1 | 1 |
| 0 | 0 | 1 |

Accordingly, whenever there is a logic zero level on either input, this is a logic one output. The gates 107–111 are so connected that only one is on at one time; that is, the one half frequency output appears at lead 39 when a logic 1 is applied to the input 113$\bar{A}$ to Nand gate 107. Likewise, for Nand gate 108 an output occurs when a logic 1 is applied to both 113A and 113B. Likewise for Nand gate 111, an output will occur when a logic level one is applied to input 113D and no output will occur when input 113D is at logic level zero.

A pulse width carrier frequency measurement circuit 112 conditions the electronic stepping relay circuit 113. Circuit 112 has an input of pulse width from line 41, and notch width or "not pulse width" is made by inverting the pulse width through a Nand gate 114. The carrier frequency on line 42 is also fed into the measurement circuit. There are six pulse period measuring circuits in the pulse width carrier frequency measurement circuit 112 and each may be identical except for time constant. The circuit 112 is set up by a synchronizing circuit 115 so that one-half of the cycle of "not phase C," $\bar{\theta}$C, from line 40, is measured and at the end of that first half cycle an action pulse is generated whereby information is transferred from the measurement circuit 112 to the stepping relay circuit 113. At the end of this cycle of $\bar{\theta}$C, the measurement circuit is reset and the measurement is repeated. FIGS. 4*l* through 4*p* help explain this synchronizing circuit 115. Referring to FIG. 4*l* when curve 119 is a logic level one, this is the measurement part of the cycle and when curve 121 of FIG. 4*n* is a zero, this is the action pulse part of the cycle when information from the measurement circuit 112 is transmitted from the synchronizing circuit 115 to the electronic stepping relay 113. Curve 122 of FIG. 4*p* shows that when the logic level becomes zero, the measurement circuit 112 is reset so that a new measurement cycle may be repeated as shown in curve 119.

The pulse width measurement circuit 112 includes six measurement circuits 116A through 116F, and each may be identical except set for different time constants. Circuit 116A will be described as typical, and this circuit measures the notch width or "not pulse width." Nand gate 125 receives notch information and phase C information, FIG. 4*l*. When phase C is a logic one level, it opens the gate 125 to receive notch information. When the notch is a one level and phase C is a one level the output of Nand gate 125 slowly ramps down to a logic level zero at a ramp rate set by the value of the integrating capacitor 128 and potentiometer 129. Once the output of gate 125 becomes approximately zero, gate 126 becomes a logic one level and conversely, gate 127 output becomes a zero level holding or locking the circuit in this state until the circuit is reset by the input to gate 127 from reset line 123 going to a logic level zero. Reset line 123 has a voltage waveform 122 thereon, as shown in FIG. 4*p*. Therefore, it can be seen this would be the reset to start another measurement cycle. Likewise, the other five circuits in 112, circuit 112, circuits 116B–116F, are similar in construction, but are set for two different time values; for measurement of minimum and maximum notch width, minimum and maximum pulse width, and minimum and maximum carrier frequency.

An action and reset circuit 131 is part of the synchronizing circuit 115, and generates the wave shapes shown in FIGS. 4*n* and 4*p*. The input to this circuit is 40 on which appears waveform 120 of FIG. 4*m*. When line 40 is at a logic level zero, output of Nand gate 132 is at a logic level one. Output of Nand gate 133 is also at a logic level one. When line 40 changes from a logic level zero to a logic level one, Nand gate 132 slowly ramps down from logic level one to logic level zero because of integrating capacitor 134. Therefore, Nand gate 133 for a short period of time has two logic level ones feeding into it. Therefore, Nand gate 133 puts out a short-time pulse or action pulse of logic level zero which is referred to as sync 1 and shown on FIG. 4*n*. Line 40 is also inverted through Nand gate 135 producing waveform 119 shown in FIG. 4*l*. In a similar manner the reset pulse, referred to as sync 2 is produced on line 123, shown in FIG. 4*p*, the same as produced the action pulse.

The synchronizing circuit 115 has inputs from the pulse width measurement circuit 112 indicated as 112A, B, C, D, E and F. Also the $\overline{\text{sync}}$ 1, "not sync one," from gate 136 is brought forward on an action line 137 to the synchronizing circuit 115. Nand gate 140 receives input information 112C, B and F. When any one of these signals is zero, the output of gate 140 is a one, likewise, 141 is a zero, 142 is a one and 143 is a zero; therefore, there is no signal on step reverse lead 147 and the circuit does not step reverse; that is, step reverse means increasing carrier frequency. Likewise, step forward would mean decreasing carrier frequency. Each of these signals is selectively applied to the stepping relay 113. When input 112C to gate 140 becomes a logic level one, it indicates that the carrier frequency is less than 300 Hz. or that the half period is greater than 1,670 microseconds. At the same time when inputs 112B and 112F become a logic level one, the step reverse line 147 would be activated when action line 137 becomes a logic level one. Input 112B is the measurement of the notch pulse width and when the notch width is greater than 750 microseconds, 112B becomes a logic level one. Likewise when the pulse width is greater than 750 microseconds, input 112F becomes a logic level one. When the carrier frequency is less than 300 Hz. and the notch width and pulse width are greater than 750 microseconds, it is proper to increase carrier frequency; therefore, step reverse action takes place when action line 137 becomes a logic one level.

Gate 144 receives logic information from measurement circuits 112D, 112E and 112A. Input 112D indicates when the carrier frequency is greater than 750 Hz. When this takes place input 112D becomes a logic level zero, which would give a step forward command on line 148 by a logic level one output from gate 146 when sync line 137 becomes logic level one. Likewise, the same action would take place when 112E or 112A become a logic level zero and activate the step forward line. 112E is when pulse width becomes less than 300 microseconds. 112A is when the notch width becomes less than 300 microseconds. It can be seen that any one of the three logic zero levels into Nand gate 144 will cause the system to step forward. Conversely, in Nand gate 140 all three logic levels of a one must be present to cause a step reverse command.

The electronic stepping relay 113 has five stepping circuits 117A through 117E. The internal circuitry is shown for circuits 117A and 117B, with the circuitry of circuits 117C, D and E the same as that of 117B. In the electronic stepping relay circuit 113, initially the inputs 113$\bar{A}$, 113$\bar{B}$, 113$\bar{C}$, 113$\bar{D}$ and 113$\bar{E}$ are in logic level one. Conversely, 113A, B, C, D and E are at logic level zero. Therefore, Nand gate 107 allows the pulses to pass to the carrier frequency output line 39 from flip-flop 101. The information from all other flip-flops 102, 103, 104 and 105 is rejected by their output Nand gates. When a step forward signal comes from the synchronizing circuit 115, line 148 becomes a logic level one which means to decrease carrier frequency. When line 148 becomes a one, output of gate 154 becomes a logic level zero, output of gate 155 becomes a one, and output of gate 156 becomes a zero holding in gate 154 at a logic level zero. Therefore, the function of gate 155 and 156 is a locking or latching system on gate 154. Therefore, line 113$\bar{A}$ becomes a zero and line 113A becomes a one. This prevents information from going through Nand gate 107 but allowing information to go through Nand gate 108 cutting the carrier frequency on line 39 in half. At the same time when 113$\bar{A}$ made the transition from one to zero, the zero information was applied to gate 160 and due to the integrating capacitor 161 the output of gate 160 made a slow transition from the logic level zero to one allowing gate 162 to then accept information. The purpose of integrating capacitor 161 and gate 160 is to prevent the information from going to gates 162 and 154 at the same time from the step forward line 148. When the next step forward pulse comes along it will be fed into gate 162. Since the output of gate 160 is now transferred to logic level one, when this pulse comes along output 113$\bar{B}$ on gate 162 will go to a zero level, conversely line 113B will be a one level. Gate 163 and 164 will lock the output of gate 162 at its zero level as described previously. Since 113$\bar{B}$ is now a zero level, this prevents information from going through Nand gate 108 but allows information to go through Nand gate 109.

If a step reverse signal should now occur on line 147, the one level would be put into gates 157, 165 and the rest of the similarly placed gates in circuits 117A through 117E. When the one level goes into gate 165, the output of gate 165 is zero pulling 113B to a zero level releasing the locking mechanism of gates 163 and 164. Therefore, 113$\bar{B}$ becomes a one and 113B becomes a zero transferring the carrier frequency line 39 from Nand gate 109 to Nand gate 108. At the same time when line 113B transfers to logic level zero, its input on gate 158 allows gate 157 to pass information after a time delay caused by gate 158 and integrating capacitor 159. When the next step reverse signal comes through, it would be fed into the step reverse line 147, it would be fed into the gate 157. This would force gate 157 output to a zero level resetting gates 155 and 156 so that now the carrier frequency line 39 is connected to flip-flop 101 and the Nand gates 108, 109, 110 and 111 prevent information from passing through. FIGS. **4*l* and 4*m* illustrate that the incoming wave is interrogated on the first half of this cycle and then a change switching point in the carrier is made at the beginning of the next half cycle according to wave form 121 shown in FIG. 4*n***. This action pulse establishes that there will be a shift made if a shift is required because of too small a notch width or pulse width or too high or too low a carrier frequency is attempted.

The circuit of FIG. 8 establishes carrier to fundamental ratios of 48, 24, 12, 6 and 3, as a simplification of the six envelopes of FIG. 7. If ratios of 9 and 15 are included, then at the various switch points the ratio change is not always 2:1, and in such case different limits of notch and pulse width and carrier frequency will be employed from those shown in Table 1 above. The curve 90 of V/Hz. in FIG. 7 indicates that with adaptive ratio system switch points 91, 92 and 93 are completely independent of the carrier frequency at which switch point 94 occurs. Obviously for adaptive control this is true, regardless of the slope of the V/Hz. relationship, as long as this curve remains within the permissible operating range of the inverter.

The adaptive ratio control still retains the notch width clamp function of clamp circuit 47 as did both the fixed and variable ratio systems. This time, however, it can be set up based on only the notch requirements of the final switch point. Take for example, the constant Hp region in the 3 $R_{c/f}$ mode. Once the switch point 95 has been made, the error voltage will be sufficiently large then the notch width clamp will function and as operating frequency approaches its upper limit of 120 Hz., the clamp will keep notch time >300 $\mu$seconds. Prior to the final transition at switch point 95, no such limit is necessary.

Transition at switch point 96 to unmodulated six-step is an optional feature of adaptive control. In some applications where additional output voltage over a constant Hp range is essential it can be introduced. Obviously, from FIG. 7 a slight step in voltage will be encountered at the carrier switch point. Just as clearly, the magnitude of this step will depend on the operating frequency at which it is made. Therefore, reasonable engineering judgement must be exercised whenever unmodulated six-step is to be employed.

Figures 9A, 9B, 9C, 9D, 9E, 9F:
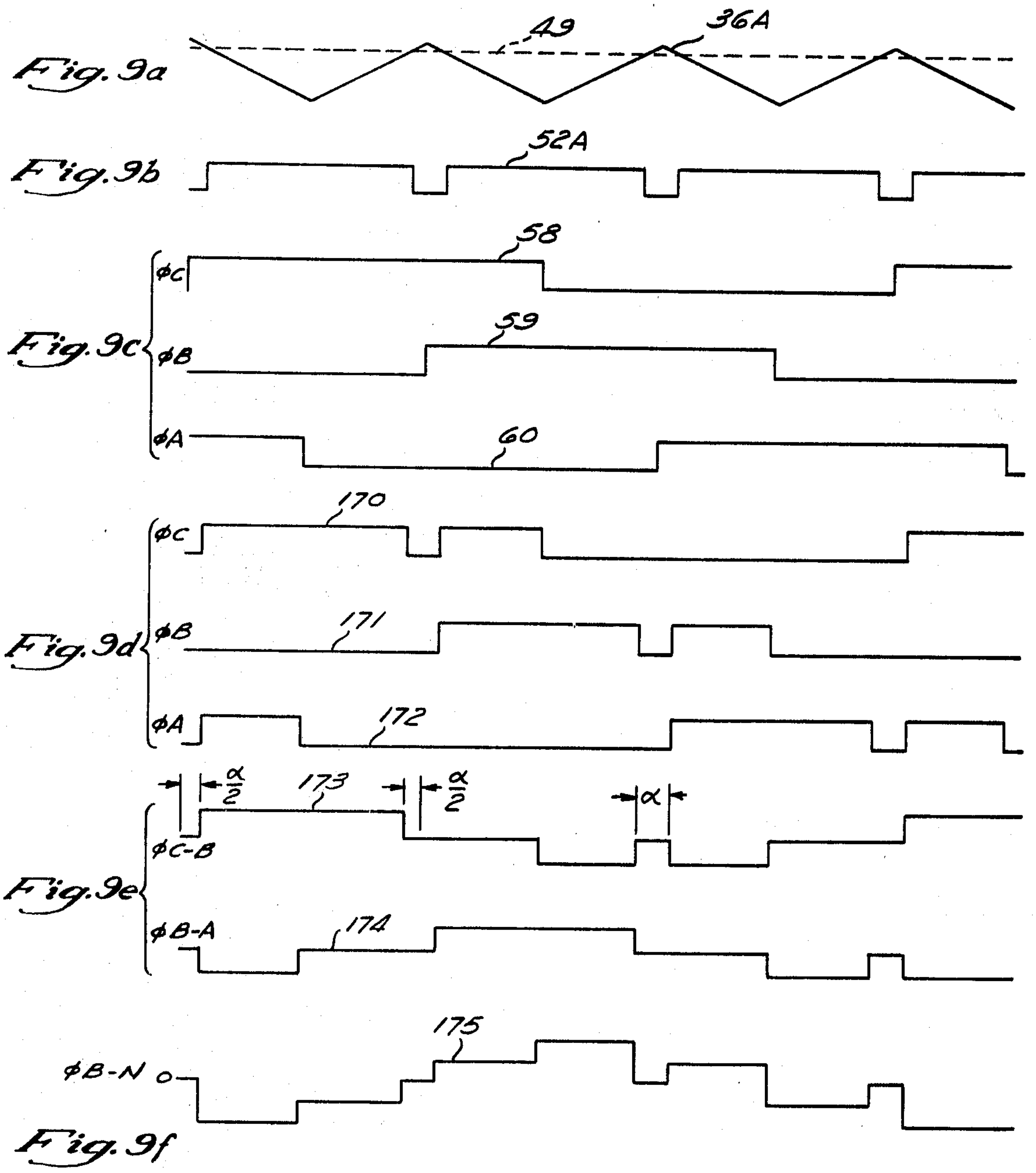
FIG. 9 is a graph of output voltage versus time.

The FIGS. **4*a* through 4*c* show a ratio of 6:1 of carrier to fundamental frequencies. This is operating inside the envelope 98 of FIG. 7 and outside the envelope 99 whereat the ratio is 9:1. The present circuit additionally provides operation inside envelope 97 and outside envelope 98 whereat the ratio of carrier to fundamental frequencies is 3:1. FIG. 9 illustrates this condition. The DC reference level or error signal is shown by curve 49A in FIG. 9*a*. Also, curve 36A shows the triangular carrier signal on lead 36. FIG. 2 shows that these two signals are compared in the comparator circuit 90 and the resultant is shown on curve 52A on FIG. 9*b*. FIG. 9*c* shows the unmodulated phase outputs 58, 59 and 60 similar to that shown in FIG. 4*c*. FIG. 9*d* shows the modulated phase signals 170, 171 and 172 for phase C, phase B and phase A, respectively. FIG. 9*e* shows a waveform 173 of the line-to-line voltage obtained on phase C relative to phase B. FIG. 4*e* also shows a waveform 174 of the line-to-line voltage of phase B relative to phase A. These show the unsymmetrical nature of the waveforms developed in these line-to-line voltages. Curve 173 shows that there is a notch having a width alpha in one half cycle of the fundamental frequency separating two pulses and in the other half cycle there is a single pulse of voltage. Curve 173** also shows that the total length of time that these pulses exist in each of the negative and positive half cycles is the same. To accomplish this a notch of one half alpha is removed from each end of the single pulse in the positive half cycle. This means that the integral of each the positive and negative half cycles is the same. This means that the area under each curve, relative to the zero axis, is equal for the positive and negative half cycles.

FIG. 9*f* shows a waveform 175 of the phase B to neutral voltage. This is similar to FIG. 3*g*. This waveform 175 better illustrates the presence of second harmonic voltages which are present in the output due to the dis-symmetry between the positive and negative half cycles. In the six-step wave of FIG. 3*g*, 100 percent of the relative output voltage is obtainable from the inverter. In the modulated six-step wave with the ratio of 6:1 between carrier and fundamental frequency, as illustrated in FIG. 4*e*, about 85–89 percent of the possible inverter output voltage may be obtained. This is because of the limitations placed on the inverter by the notch width alpha which may be in the order of 300 to 400 microseconds. FIGS. 9*e* and 9*f* illustrate that about 93–94 percent of the full unmodulated output voltage may be obtained when the carrier to fundamental frequency is established at a frequency of 3:1. Of course by widening the notches from the minimum possible, e.g., 300 microseconds, the RMS output voltage may be gradually reduced along the curve 90, FIG. 7, from the switching point 96 down to the switching point 95. If one had to make a step in the voltage from switch point E directly up to the full unmodulated six-step fundamental voltage, then, as shown in FIG. 7, this would be a step in the voltage of about 11 to 15 percent. This would be a considerable jump in torque on the motor load 24 and in many cases would be intolerable. The present invention permits the gradual change in relative output voltage all the way up to the switch point 96. The second harmonic voltages are not desirable because they introduce motor heating losses but it has been found that these may be tolerated for short periods of time and are certainly far more desirable than the large jump in voltage and concomitant jump in torque.

In summary, the adaptive ratio technique optimizes the operating characteristics of the modulated six-step inverter. This control automatically adjusts carrier ratio to take care of all possible limiting combinations of pulse width, notch width and carrier frequency. In the process it maintains a high carrier frequency thereby considerably reducing undesirable harmonics throughout the entire operating range.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A pulse width modulated inverter operable from a direct current source to AC load terminals, comprising in combination, switch means selectively conductive to supply an AC voltage from the DC source to the load terminals, means to control conduction of said switch means to establish a voltage between two load terminals which is unsymmetrical in the positive and negative half cycles and with only a single pulse of voltage in one half cycle and two pulses of voltage in the other half cycle separated by a gap having a width $\alpha$.

2. An inverter as set forth in claim 1, including means in said control means to shorten the time length of the pulse of voltage in said one half cycle in order to have the same total length of a pulse of voltage in said one half cycle as in said other half cycle.

3. An inverter as set forth in claim 1, wherein said control means establishes conduction of current in said one-half cycle for a length of time substantially equal to the length of time current is conducted in said other half cycle.

4. An inverter as set forth in claim 1, wherein said load terminals are three-phase terminals, and means establishing a ratio of 3:1 between the frequency of said control means and the fundamental of said AC load.

5. An inverter as set forth in claim 1, including means to measure the width of said gap $\alpha$ to control the inverter to have a minimum gap width equal to the commutation time of said switch means.

6. An inverter as set forth in claim 1, including means in said control means to establish a shortening of the length of time of conduction in said one half cycle proportional to the shortening of time of conduction in said other half cycle because of said gap having a width $\alpha$.

7. An inverter as set forth in claim 1, wherein said switch means includes three switches connected to the positive terminal of the direct current source and three switches connected to the negative terminal of the DC source, each switch in the positive group being paired by a series connection with a switch in the negative group, and connection means to supply voltage to the AC load terminals from the three junctions of the series connected switches through the closure of three of the six switches in sequence with the three of the six being one from each pair.

8. An inverter as set forth in claim 1, including said load terminals being three-phase terminals, said control means operating at a variable frequency, and means to change the ratio of the frequency of said control means relative to the frequency of the fundamental on the load terminals from a ratio of 6:1 to a ratio of 3:1.

9. An inverter as set forth in claim 1, wherein said AC load terminals are three-phase terminals, said control means including means to generate a generally triangular control wave, means to generate a signal having at least some portions of constant magnitude, and means to establish a current flow in each phase in accordance with a comparison of said control wave and said signal.

10. An inverter as set forth in claim 9, including means to establish a ratio of 3:1 of the frequency of said control wave relative to the frequency of the fundamental at said load terminals.

11. An inverter as set forth in claim 1, wherein said AC load terminals are three-phase terminals, said control means including means to generate a generally triangular control wave, means to generate a substantially square wave phase signal corresponding to each phase of the output power and phased 120° apart, means to vary the relative magnitudes of the triangular and square waves, and means establishing a power flow in each phase when one of said waves exceeds the magnitude of the other.

12. An inverter as set forth in claim 11, including means to establish the ratio of the frequency of said square waves relative to said control waves at the ratio of 1:3.

13. An inverter as set forth in claim 1, wherein the inverter output voltage has pulses width notches therebetween and the pulses occurring at a carrier frequency to establish a lower fundamental frequency at the load terminals, including means responsive to minumum pulse width to change the ratio of carrier frequency to fundamental frequency.

14. An inverter as set forth in claim 1, wherein the inverter output voltage has pulses width notches therebetween and the pulses occurring at a carrier frequency to establish a lower fundamental frequency at the load terminals, including means responsive to maximum pulse width to change the ratio of carrier frequency to fundamental frequency.

15. An inverter as set forth in claim 1, wherein the inverter output voltage has pulses width notches therebetween and the pulses occurring at a carrier frequency to establish a lower fundamental frequency at the load terminals, including means responsive to minimum notch width to change the ratio of carrier frequency to fundamental frequency.

16. A pulse width modulated inverter operable from a direct current source to AC load terminals, the pulses in the inverter output voltage having notches therebetween and the inverter having pulses occurring at a carrier frequency for establishing a lower fundamental frequency at the load terminals, comprising in combination, switch means selectively conductive to supply an AC voltage from the DC source to the load terminals, means to control conduction of said switch means, and means measuring pulse width to change the ratio of carrier to fundamental frequencies.

17. An inverter as set forth in claim 16, wherein said pulse width measuring means is responsive to minimum pulse width.

18. An inverter as set forth in claim 16, wherein said pulse width measuring means is responsive to maximum pulse width.

19. An inverter as set forth in claim 16, including means measuring minimum notch width to change the ratio of carrier frequency to fundamental frequency.

20. An inverter as set forth in claim 16, including means responsive to maximum carrier frequency to change the ratio of carrier frequency to fundamental frequency.

21. An inverter as set forth in claim 16, including means responsive to maximum notch width to change the ratio of carrier to fundamental frequencies.

22. An inverter as set forth in claim 16, including means responsive to minimum carrier frequency to change the ratio of carrier frequency to fundamental frequency.

23. An inverter as set forth in claim 16, including means responsive to minimum notch width and maximum carrier frequency to change the ratio of carrier frequency to fundamental frequency.

24. An inverter as set forth in claim 16, including means responsive to minimum notch width, and notch width clamp means to clamp the notch width at a pre-set minimum despite changing fundamental frequency.

25. An inverter as set forth in claim 16, wherein said ratio change means maintains a high carrier frequency relative to the fundamental frequency.

26. A three-phase inverter operable from a substantially fixed direct current source and having three output terminals each located between a switch to the positive bus and a switch to the negative bus, a logic system controlling the turn on and turn off of said switches to establish pulses on said output terminals, input frequency signal means to said logic system which determines fundamental output frequency and a carrier frequency signal which is some multiple of the desired fundamental frequency, the interaction of the carrier and fundamental frequency determining the type and width of notches in the output wave shape for regulation of the voltage, and means to change the ratio of carrier to fundamental frequency as a function of pulse width.

27. An inverter as set forth in claim 26, wherein the ratio of the carrier to the fundamental frequency is 3:1.

28. An inverter as set forth in claim 26, wherein the carrier to fundamental frequency ratio is varied from 3 to 6 to 12 to 24 and to 48.

29. An inverter as set forth in claim 26, wherein the signals for on and off intervals in each pair of switches for a particular phase come from the interaction of a fixed amplitude triangular carrier signal and a variable amplitude fundamental frequency signal and wherein a variation of fundamental frequency signal amplitude will change the intersection points of the triangular wave and the fixed wave generating a variable pulse width in the output of the inverter.

30. An inverter as set forth in claim 29, wherein no pulses are produced in each phase during the half periods of the fundamental frequency signal being at zero voltage.

31. An inverter as set forth in claim 26, wherein the carrier to fundamental ratio is changed as a function of reaching certain minimum notch widths in the output wave.

32. An inverter as set forth in claim 26, wherein the carrier to fundamental frequency ratio is changed as a function of reaching certain minimum pulse widths.

33. An inverter as set forth in claim 26, wherein the output wave is changed from one carrier ratio to another as a combined function of pulse width, notch width and maximum carrier frequency.

34. An inverter as set forth in claim 26, having an unmodulated six-step output waveform as the top range of operation.

35. An inverter as set forth in claim 26, wherein transitions are made from one ratio to another with a minimum change in fundamental frequency amplitude.

36. An inverter as set forth in claim 26, wherein a carrier to fundamental frequency ratio of 3:1 is used leading to production of symmetrical three-phase output waves but unsymmetrical positive and negative half cycles on the individual phase voltages leading to even harmonics being present in the final waveform.

37. An inverter as set forth in claim 36, wherein the transition from the ratio of 3:1 to the unmodulated six-step wave is made by a sudden jump in output voltage as frequency and voltage are raised and said jump is only one half the magnitude it would be if a ratio of 6:1 were used.

38. A system as described in claim 26, wherein changes from one carrier ratio to another take place with hysteresis; namely, at a higher frequency for increasing fundamental frequency than for decreasing fundamental frequency.

39. A wide frequency range inverter as described in claim 38, having a continuous output frequency range and operating with substantially the same absolute carrier frequency throughout the range, switch points occurring as a function of frequency limitations and pulse and notch width limitations.

40. An inverter as set forth in claim 26, including means for utilizing a ratio of 3:1 between the carrier wave and the fundamental, said means providing an unsymmetrical output wave for each phase, said wave having two half notches on one end of one half cycle and one centered full notch on the other half cycle.

* * * * *